United States Patent
Kim et al.

(10) Patent No.: US 8,875,191 B2
(45) Date of Patent: Oct. 28, 2014

(54) DEVICE FOR REPRODUCING CONTENT AND METHOD THEREOF

(75) Inventors: Taehyeong Kim, Seoul (KR); Yongwon Cho, Gyeonggi-do (KR); Sunjin Yu, Gyeonggi-do (KR); Sungjin Kim, Gyeonggi-do (KR); Soungmin Im, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 444 days.

(21) Appl. No.: 13/242,971

(22) Filed: Sep. 23, 2011

(65) Prior Publication Data

US 2013/0021535 A1    Jan. 24, 2013

Related U.S. Application Data

(63) Continuation of application No. PCT/KR2011/005271, filed on Jul. 18, 2011.

(51) Int. Cl.
| | |
|---|---|
| H04N 7/18 | (2006.01) |
| G06F 3/00 | (2006.01) |
| G06F 3/16 | (2006.01) |
| H04N 21/485 | (2011.01) |
| H04N 21/414 | (2011.01) |
| H04N 21/43 | (2011.01) |
| H04N 21/442 | (2011.01) |
| H04N 21/41 | (2011.01) |
| H04N 7/173 | (2011.01) |
| H04N 7/16 | (2011.01) |

(52) U.S. Cl.
CPC ..... *H04N 21/41407* (2013.01); *H04N 21/4852* (2013.01); *H04N 21/4302* (2013.01); *H04N 21/44227* (2013.01); *H04N 21/4854* (2013.01); *H04N 21/4122* (2013.01)
USPC .......... 725/74; 725/78; 725/80; 725/81; 725/83; 725/133; 725/141; 715/716; 715/717; 715/718; 715/719; 715/727

(58) Field of Classification Search
USPC .......... 725/133, 141, 74, 78, 80, 81, 83; 715/716, 717, 718, 719, 727
See application file for complete search history.

(56) References Cited

U.S. PATENT DOCUMENTS

| | | | |
|---|---|---|---|
| 6,807,367 B1 * | 10/2004 | Durlach | 386/221 |
| 2006/0059253 A1 * | 3/2006 | Goodman et al. | 709/223 |

(Continued)

FOREIGN PATENT DOCUMENTS

| | | |
|---|---|---|
| KR | 10-2011-0039672 A | 4/2011 |
| KR | 10-2011-0063200 A | 6/2011 |
| KR | 10-2011-0064635 A | 6/2011 |
| KR | 10-2011-0070612 A | 6/2011 |

OTHER PUBLICATIONS

International Search Report dated Feb. 29, 2012 for Application No. PCT/KR2011/005271, with English Translation, 8 pages.

*Primary Examiner* — Hoang-Vu A Nguyen-Ba
(74) *Attorney, Agent, or Firm* — Fish & Richardson P.C.

(57) ABSTRACT

Provided are an electronic device and an operating method thereof. When a predetermined event occurs while contents are being output, a video and a sound of the contents are controlled to be respectively output through different electronic devices, thus improving a content provision environment for a user.

20 Claims, 23 Drawing Sheets

(56) References Cited

U.S. PATENT DOCUMENTS

| | | | |
|---|---|---|---|
| 2007/0047916 A1* | 3/2007 | Lee | 386/96 |
| 2010/0235765 A1* | 9/2010 | Worthington | 715/760 |
| 2011/0046761 A1* | 2/2011 | Titchener et al. | 700/94 |
| 2011/0087759 A1 | 4/2011 | You | |
| 2011/0219420 A1* | 9/2011 | Raveendran et al. | 725/116 |
| 2012/0051560 A1* | 3/2012 | Sanders | 381/105 |
| 2012/0057075 A1* | 3/2012 | Kabuto et al. | 348/564 |

* cited by examiner

| Command code (CONTENTS OUTPUT REQUEST) | Payload (SOUND LEVEL x) |
|---|---|

DEVICE FOR REPRODUCING CONTENT AND METHOD THEREOF

The present application claims priority to PCT Application No. PCT/KR2011/005271 filed on Jul. 18, 2011, the entire contents of which are hereby incorporated by reference in their entirety.

BACKGROUND

1. Field

The present invention relates to an electronic device and an operating method thereof, and more particularly, to an electronic device capable of effectively outputting a video and a sound contained in contents in an N-screen implementation environment, and an operating method of the electronic device.

2. Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

A terminal as a multimedia player can be referred to as a display device since it generally has a function of displaying video information.

Terminals can be divided into a mobile terminal and a stationary terminal. Examples of the mobile terminal can include laptop computers, cellular phones, etc. and examples of the stationary terminal can include television systems, monitor for desktop computers, etc.

SUMMARY

Accordingly, one object of the present invention is to address the above-noted and other drawbacks of the related art.

Another object of the present invention is to provide an electronic device capable of controlling a video and a sound, included in contents, to be output from respectively different electronic devices when a predetermined event occurs while the contents are being output, and an operating method of the electronic device.

Still another object of the present invention is to provide an electronic device capable of controlling contents including a video and a sound to be output through another output device in consideration of a specific sound level when the output device for the contents is changed to another electronic device while the electronic device is outputting the contents at the specific sound level.

To accomplish the objects of the present invention, according to an aspect of the present invention, there is provided an electronic device including: an output unit; and a control unit controlling a video and a sound of contents, being output through the output unit, to be respectively output through different electronic devices when a predetermined event occurs.

To accomplish the objects of the present invention, according to another aspect of the present invention, there is provided an electronic device including: an output unit; and a control unit controlling contents to be output through another electronic device on the basis of a specific sound level when the another electronic device is made to participate in outputting the contents while the contents are being output through the output unit at the specific sound level.

To accomplish the objects of the present invention, according to another aspect of the present invention, there is provided an operating method of an electronic device, including: outputting contents including a video and a sound through an output unit; and controlling the video and the sound to be respectively output through different electronic devices when a predetermined event occurs.

To accomplish the objects of the present invention, according to another aspect of the present invention, there is provided an operating method of an electronic device, including: outputting contents through an output unit at a specific sound level; and when a device for outputting the contents is changed, controlling the contents to be output through the changed device on the basis of the specific sound level.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

This document will now be described more fully with reference to the accompanying drawings, in which exemplary embodiments of this document are shown. This document may, however, be embodied in many different forms and should not be construed as being limited to the embodiments set forth herein; rather, there embodiments are provided so that this disclosure will be thorough and complete, and will fully convey the concept of this document to those skilled in the art.

Hereinafter, a mobile terminal relating to this document will be described below in more detail with reference to the accompanying drawings. In the following description, suffixes module and unit are given to components of the mobile terminal in consideration of only facilitation of description and do not have meanings or functions discriminated from each other.

The mobile terminal described in the specification can include a cellular phone, a smart phone, a laptop computer, a digital broadcasting terminal, Personal Digital Assistants (PDA), a Portable Multimedia Player (PMP), a navigation system and so on.

Figure 1:
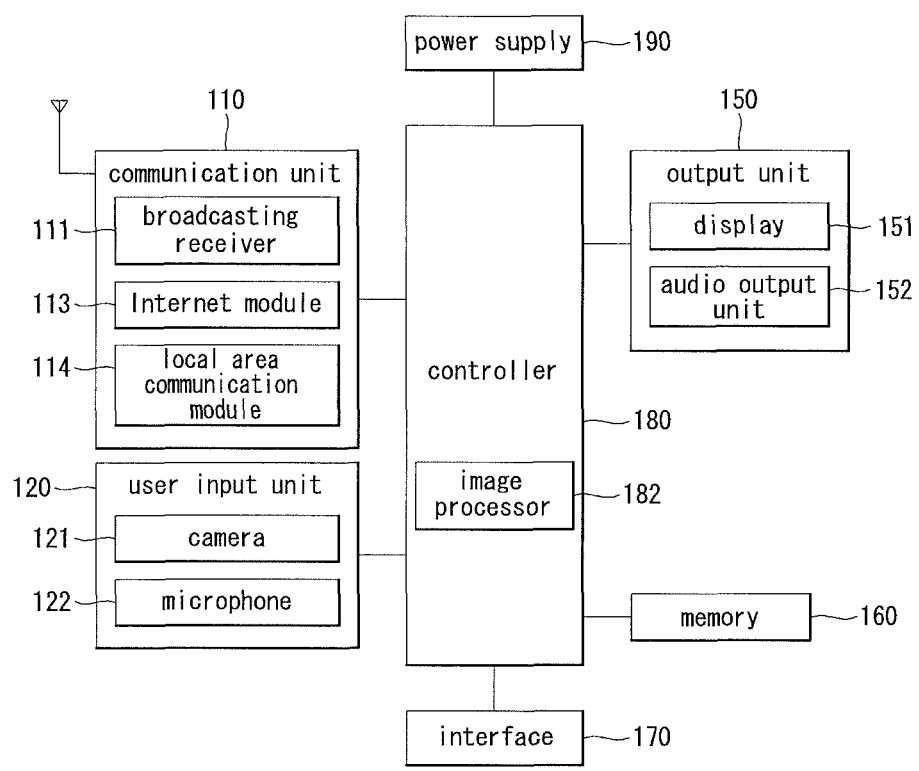
FIG. 1 is a block diagram of a display device relating to an embodiment of this document.

FIG. 1 is a block diagram of a display device relating to an embodiment of this document.

As shown, the display device 100 may include a communication unit 110, a user input unit 120, an output unit 150, a memory 160, an interface 170, a controller 180, and a power supply 190. Not all of the components shown in FIG. 1 may be essential parts and the number of components included in the display device 100 may be varied.

The communication unit 110 may include at least one module that enables communication between the display device 100 and a communication system or between the display device 100 and another device. For example, the communication unit 110 may include a broadcasting receiving module 111, an Internet module 113, and a local area communication module 114.

The broadcasting receiver 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal of a data broadcasting signal.

The broadcasting related information may be information on a broadcasting channel, a broadcasting program or a broadcasting service provider, and may be provided even through a communication network.

The broadcasting related information may exist in various forms. For example, the broadcasting related information may exist in the form of an Electronic Program Guide (EPG) of a Digital Multimedia Broadcasting (DMB) system or in the form of an Electronic Service Guide (ESG) of a Digital Video Broadcast-Handheld (DVB-H) system.

The broadcasting receiver 111 may receive broadcasting signals using various broadcasting systems. The broadcasting signals and/or broadcasting related information received through the broadcasting receiver 111 may be stored in the memory 160.

The Internet module 113 may correspond to a module for Internet access and may be included in the display device 100 or may be externally attached to the display device 100.

The local area communication module 114 may correspond to a module for near field communication. Furthermore, Bluetooth, Radio Frequency Identification (RFID), Infrared Data Association (IrDA), Ultra WideBand (UWB) and/or ZigBee may be used as a near field communication technique.

The user input unit 120 is used to input an audio signal or a video signal and may include a camera 121 and a microphone 122.

The camera 121 may process image frames of still images or moving images obtained by an image sensor in a video telephony mode or a photographing mode. The processed image frames may be displayed on a display 151. The camera 121 may be a 2D or 3D camera. In addition, the camera 121 may be configured in the form of a single 2D or 3D camera or in the form of a combination of the 2D and 3D cameras.

The image frames processed by the camera 121 may be stored in the memory 160 or may be transmitted to an external device through the communication unit 110. The display device 100 may include at least two cameras 121.

The microphone 122 may receive an external audio signal in a call mode, a recording mode or a speech recognition mode and process the received audio signal into electric audio data. The microphone 122 may employ various noise removal algorithms for removing or reducing noise generated when the external audio signal is received.

The output unit 150 may include the display 151 and an audio output module 152.

The display 151 may display information processed by the display device 100. The display 151 may display a User Interface (UI) or a Graphic User Interface (GUI) relating to the display device 100. In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display. The transparent display may include a transparent liquid crystal display. The rear structure of the display 151 may also be of a light transmissive type. Accordingly, a user may see an object located behind the body of terminal through the transparent area of the terminal body, occupied by the display 151.

The display device 100 may include at least two displays 151. For example, the display device 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When a user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The audio output module 152 may output audio data received from the communication unit 110 or stored in the memory 160. The audio output module 152 may output audio signals related to functions, such as a call signal incoming tone and a message incoming tone, performed in the display device 100.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, Random Access Memory (RAM), Static RAM (SRAM), Read-Only Memory (ROM), Electrically Erasable Programmable ROM (EEPROM), Programmable ROM (PROM), magnetic memory, magnetic disks, or optical disks. The display device 100 may also operate in relation to a web storage performing the storing function of the memory 160 on the Internet.

The interface 170 may serve as a path to all external devices connected to the display device 100. The interface 170 may receive data from the external devices or power and transmit the data or power to internal components of the display device 100 or transmit data of the display device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The controller 180 may control overall operations of the display device 100. For example, the controller 180 may perform control and processing for voice communication. The controller 180 may also include an image processor 182 for pressing image, which will be explained later.

The power supply 190 receives external power and internal power and provides power required for each of the components of the display device 100 to operate under the control of the controller 180.

Various embodiments described in this document can be implemented in software, hardware or a computer readable recording medium. According to hardware embodiment, embodiments of this document may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and/or electrical units for executing functions. The embodiments may be implemented by the controller 180 in some cases.

According to software embodiment, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
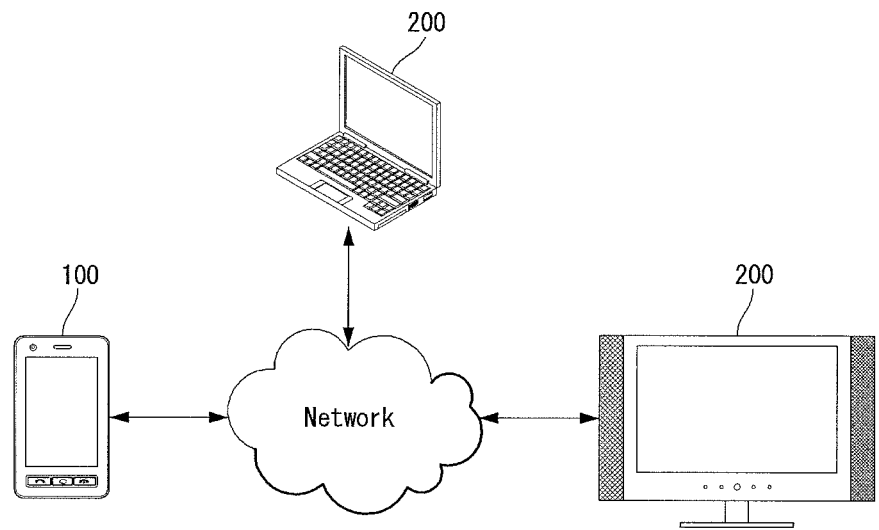
FIG. 2 is a diagram illustrating a structure of a service network related to the display device of FIG. 1.

FIG. 2 is a diagram illustrating a structure of a service network according to an embodiment of this document and a structure of a service network for sharing content between electronic devices.

Referring to FIG. 2, the display device 100 is connected to at least one external electronic device 200 that can perform an image display function through a network, and transmits content to the external electronic device 200 in order to display content in the external electronic device 200 or receives content from the external electronic device 200 and displays the content on a screen and thus shares the content with the external electronic device 200.

FIG. 2 illustrates a case where the display device 100 is a mobile phone and the external electronic device 200 is television (TV) and a laptop computer, but this document is not limited thereto. According to an embodiment of this document, the mobile terminal 100 and the external electronic device 200 may be a mobile phone, a TV, a laptop computer, a smart phone, a digital broadcasting terminal, a PDA, a Portable Multimedia Player (PMP), a navigator, a desktop computer, a set-top box, a Personal Video Recorder (PVR), and an electronic frame.

Referring again to FIG. 2, in order for the display device 100 to share content with the external electronic device 200, it is necessary to form a platform of the display device 100 and the external electronic device 200 for mutual compatibility between the display device 100 and the external electronic device 200. For this reason, the electronic devices 100 and 200 according to an embodiment of this document form a Digital Living Network Alliance (DLNA®) platform.

According to the DLNA®, IPv4 may be used as a network stack, and for network connection, Ethernet, a Wireless Local Network (WLAN) (802.11a/b/g), Wireless Fidelity (Wi-Fi), Bluetooth, and a communication method that may perform IP connection may be used.

According to the DLNA®, in order to discover and control an electronic device, Universal Plug and Play (UPnP™), particularly, UPnP™ Architecture and UPnP™ Device Architecture are generally used. For example, in order to discover an electronic device, a Simple Service Discovery Protocol (SSDP) can be used. Further, in order to control an electronic device, a Simple Object Access Protocol (SOAP) can be used.

According to the DLNA®, in order to transmit media, HTTP and RTP can be used, and JPEG, LPCM, MPEG2, MP3, and MPEG4 can be used as a media format.

According to the DLNA®, Digital Media Server (DMS), Digital Media Player (DMP), Digital Media Renderer (DMR), and Digital Media Controller (DMC) type electronic devices may be supported.

Figure 3:
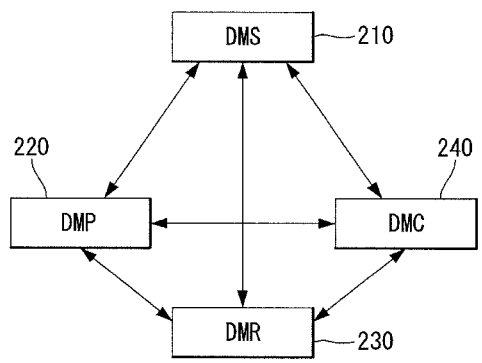
FIG. 3 is a conceptual diagram of a DLNA network.

FIG. 3 is a conceptual diagram of a DLNA® network.

The DLNA® is a network and is a typical name of a standardization device for enabling to mutually share content such as music, a moving image, and a still image between electronic devices.

The DLNA® generally uses an UPnP protocol.

The DLNA network includes a DMS 210, a DMP 220, a DMR 230, and a DMC 240.

The DLNA network includes at least one of each of the DMS 210, the DMP 220, the DMR 230, and the DMC 240. In this case, the DLNA provides a specification for mutual compatibility of the each device. The DLNA network provides a specification for mutual compatibility between the DMS 210, the DMP 220, the DMR 230, and the DMC 240.

The DMS 210 provides digital media content. In other words, the DMS 210 stores and manages content. The DMS 210 receives and executes various commands from the DMC 240. For example, when the DMS 210 receives a play command, the DMS 210 searches for content to play and provides the content to the DMR 230. The DMS 210 may include, for example, a PC, a PVR, and a set-top box.

The DMP 220 controls content or an electronic device, and controls to content to be played. That is, the DMP 220 performs a function of the DMR 230 for reproduction and a function of the DMC 240 for control. The DMP 220 may include, for example, a TV, a DTV, and a home theater.

The DMR 230 plays content. The DMR 230 plays content that receive from the DMS 210. The DMR 230 may include, for example, an electronic frame.

The DMC 240 provides a control function. The DMC 240 may include, for example, a mobile phone and a PDA.

The DLNA network may include the DMS 210, the DMR 230, and the DMC 240 or may include the DMP 220 and DMR 230.

Further, the DMS 210, the DMP 220, the DMR 230, and the DMC 240 may be a term of functionally classifying an electronic device. For example, when the mobile phone has a reproduction function as well as a control function, the mobile phone may correspond to the DMP 220, and when the DTV manages content, the DTV may correspond to the DMS 210 as well as the DMP 220.

The display device 100 shown in FIG. 1 or FIG. 2 or both may correspond to at least one of the DMS, the DMP, the DMC, and the DMR according to its function. Likewise, the external electronic device 200 may also correspond to at least one of the DMS, the DMP, the DMC, and the DMR according to its function. Accordingly, mutual compatibility between electronic devices can be guaranteed.

Figure 4:
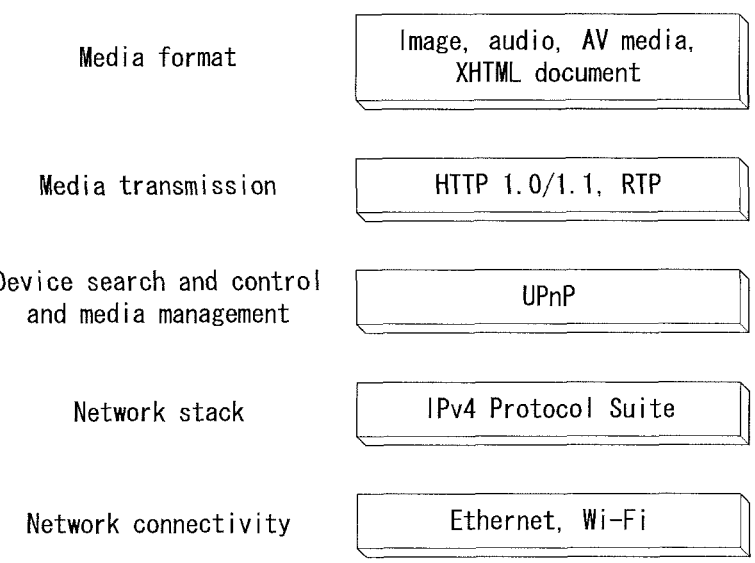
FIG. 4 is a diagram illustrating layers according to a function of a DLNA.

FIG. 4 is a diagram illustrating a function component according to the DLNA.

The function components according to the DLNA include a media format layer, a media transmission layer, a device search and control and media management layer, a network stack layer, and a network connectivity layer.

The network connectivity layer includes the physical layer and the link layer of a network. The network connectivity layer includes Ethernet, Wi-Fi, and Bluetooth. Furthermore, the network connectivity layer uses a communication medium which can perform IP connection.

The network stack layer uses an IPv4 protocol.

The device search and control and media management layer chiefly uses UPnP, particularly, UPnP AV Architecture and UPnP Device Architecture. For example, for device search, the SSDP may be used. For control, the SOAP may be used.

The media transmission layer uses HTTP 1.0/1.1 or a real-time transport protocol (RTP) in order to play streaming.

The media format layer uses images, audio, AV media, and Extensible Hypertext Markup Language (XHTML) document.

Hereinafter, methods of operating the electronic device according to some embodiments of this document are described based on the constructions and the system environments described with reference to FIGS. 1 to 4.

For convenience of a description, it is assumed that the external electronic device 200 shown in FIG. 2 is DTV, referred to as a second electronic device 200, and the display device 100 shown in FIG. 2 is a mobile terminal, referred to as a first electronic device 100.

Figure 5:
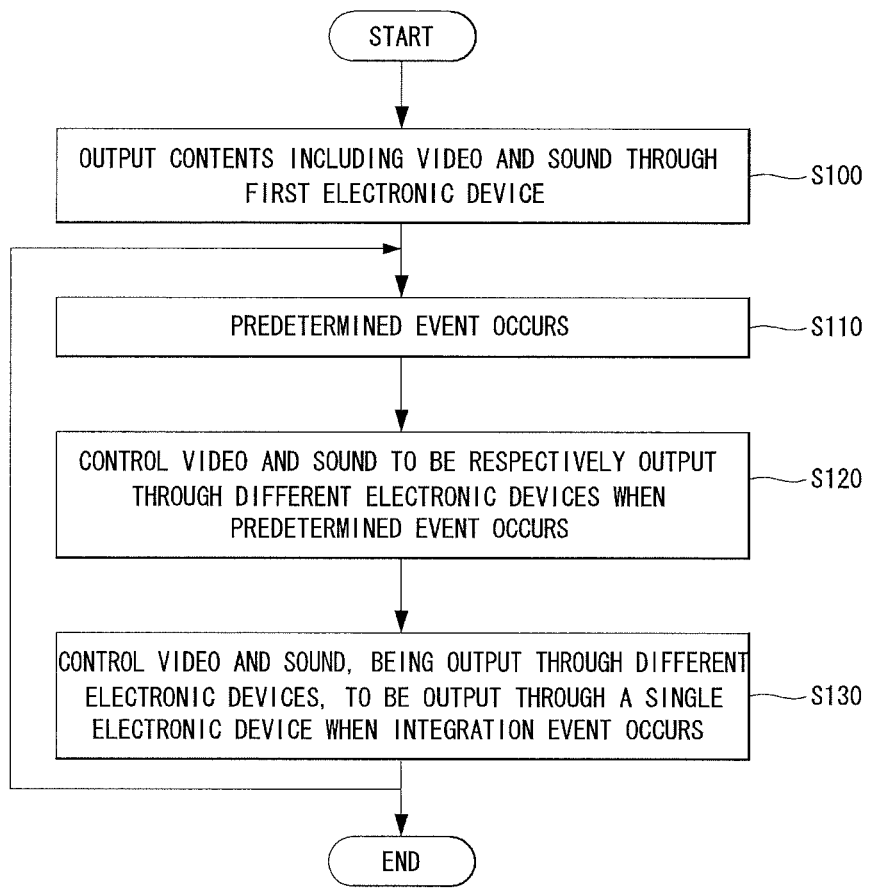
FIG. 5 is a flowchart for explaining an operating method of an electronic device according to a first embodiment of this document.

FIG. 5 is a flowchart for explaining an operating method of an electronic device according to a first embodiment of this document.

According to an implementation example of the present invention, in a case where a predetermined event occurs while a user is enjoying contents using a first electronic device 100 (i.e., a portable terminal), a video of the contents may be output through a second electronic device 200 (i.e., a DTV) and a sound of the contents may be output through the first electronic device 100. That is, the video and the sound are separately output through respective different electronic devices. In this case, an electronic device having superior display characteristics to those of the first electronic device 100 which initially output the contents may serve to output the video. Thus, a user may watch the video through the second electronic device 200 while listening to the sound through the earphone of the first electronic device 100, thus increasingly attracting user's attention to the contents.

The above is just one implementation example, and there may be various implementation examples. Hereinafter, detailed implementation methods will be described with reference the flowchart illustrated in FIG. 5.

Referring to FIG. 5, the operating method of an electronic device according to the first embodiment of this document includes at least one of operations S100, S110, S120, and S130. In detail, contents including a video and a sound are output through a first electronic device in operation S100, a predetermined event occurs in operation S110, the video and the sound are controlled to be respectively output through different electronic devices when the predetermined event occurs in operation S120, and the sound and the video are controlled to be output through a single electronic device when an integration event occurs with respect to the separated sound and video in operation S130. Hereinafter, each operation will be described in detail.

In operation S100, the first electronic device 100 may output contents including a video and a sound.

The contents according to an exemplary embodiment of the present invention may be varied. For example, the contents may include broadcasting contents, contents stored in the first electronic device 100, and contents stored in an external server. In this case, the contents may have various attributes associated with, for example, a movie, an image, a web page, multimedia data, and the like.

Meanwhile, the contents stored in the external server may refer to contents included in a DLNA network for N-screen implementation described above with reference to FIGS. 3 and 4.

Here, the N-screen may mean a user-oriented service that can share and execute multi-contents anywhere, anytime through more advanced smart systems, and can enable a continuous play mode. The DLNA for the N-screen implementation is merely one example, and various protocols such as Bonjour of Apple Inc. may be used for the N-screen implementation.

In this case, the first electronic device 100 may receive contents stored in electronic devices other than the first electronic device 100, and output the received contents.

A user may control the first electronic device 100 to output contents by using various methods. For example, a user may control the first electronic device 100 to output contents by using a remote controller, speech recognition, gesture or the like.

Figure 6:
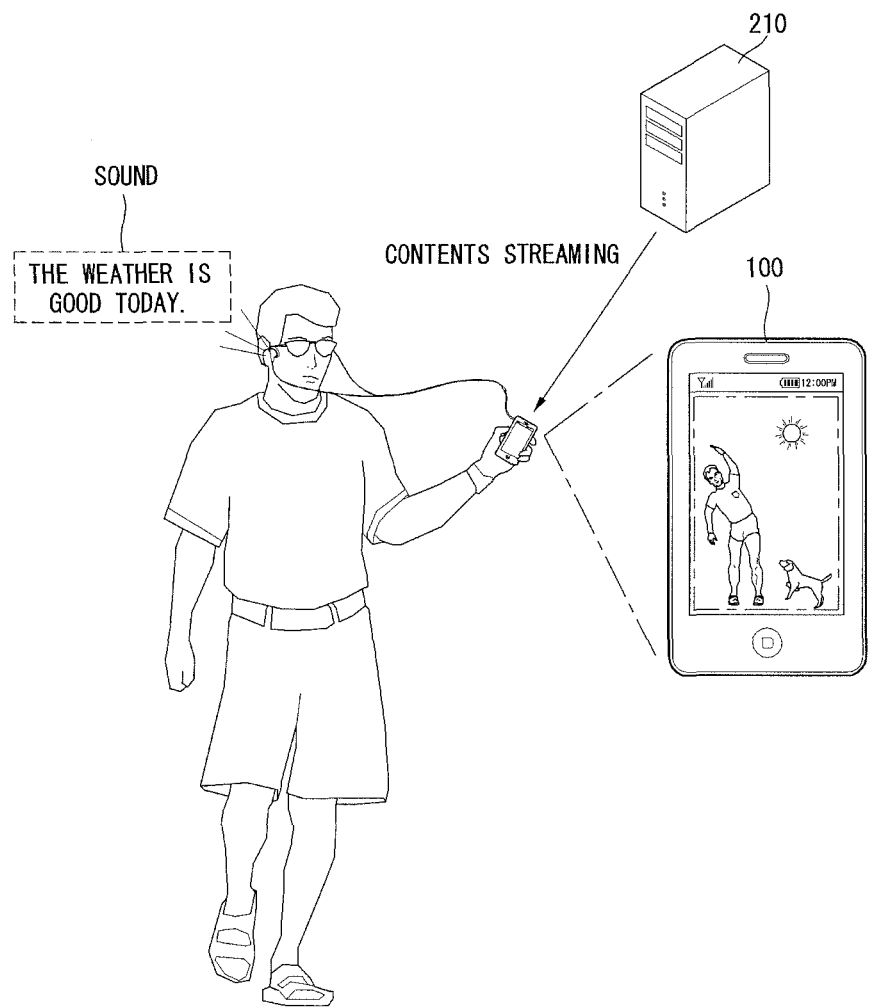
FIG. 6 is a diagram for explaining a contents output environment of an electronic device according to the first embodiment of this document.

Hereinafter, for convenience of a description, it is assumed that as shown in FIG. 6, the first electronic device 100 receives streaming of contents from a third electronic device 300, which is a contents provider server, outputs a video of the contents through the display 151, and outputs a sound of the contents through an audio output module 152 (e.g., an earphone). Thus, the user can move while watching the contents through the first electronic device 100 as shown in the drawing.

In operation S110, the first electronic device 100 may detect the occurrence of a predetermined event.

The predetermined event may include any case in which a request to separately output a video and a sound of contents, which is currently being output by the first electronic device 100, through respectively different electronic devices is made.

The predetermined event may include a case in which a user makes a request to output a video and a sound through different electronic devices, respectively (hereinafter, referred to as "a first event"), a case in which contents being output are requested to be output through another electronic device (Hereinafter, referred to as "a second event"), and a case in which a predetermined condition is satisfied (hereinafter, referred to as "a third event"). Hereinafter, each event will be described in detail.

The first event will now be described with reference to FIGS. 7 and 8.

Figure 7:
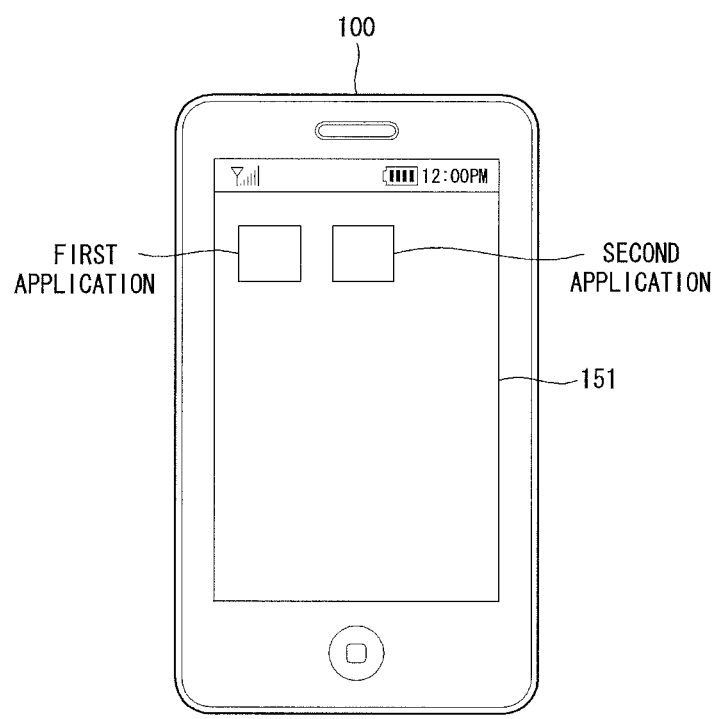
FIG. 7 illustrates an application according to the first embodiment of this document.
Figure 8:
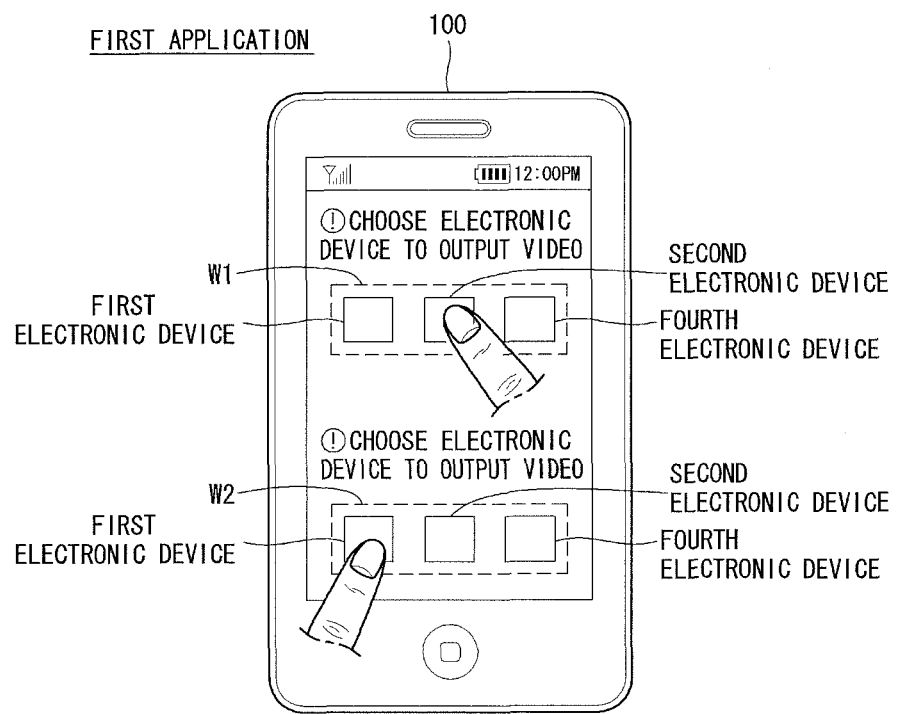
FIG. 8 illustrates a user interface of a first application according to the first embodiment of this document.

FIG. 7 illustrates an application according to the first embodiment of this document, and FIG. 8 illustrates a user interface of a first application according to the first embodiment.

A user of the first electronic device 100 may execute the first application, depicted in FIG. 7, through the interaction with the first electronic device 100. The first application is an application capable of commanding the separate output of a video and a sound.

In a case where the first application is executed, a user interface, depicted in FIG. 8, may be output. FIG. 8 illustrates a window W1 for selecting an electronic device to output a video, and a window W2 for selecting an electronic device to output a sound. Electronic devices displayed in the windows W1 and W2 may be electronic devices recognized by the first electronic device 100 according to a predetermined protocol. In this case, the predetermined protocol may be, for example, a simple service discovery protocol (SSDP).

A user may select an electronic device to output a video through the window W1 while selecting an electronic device to output a sound through the window W2. In this case, the user may select a DTV that has a higher resolution than a display of a smart phone which is outputting contents in operation S100, as an electronic device to output a video according to the user's taste. For convenience of a description, a second electronic device 200 (e.g., a DTV) is selected as an electronic device to output a video and the first electronic device 100 (e.g., a smart phone) is selected as an electronic device to output a sound in this embodiment.

When the electronic devices to respectively output a video and a sound are selected through the first application as described above, the first electronic device 100 determines this situation as the first event.

Hereinafter, the second event will be described with reference to FIG. 7, and FIGS. 9 through 13.

Figure 9:
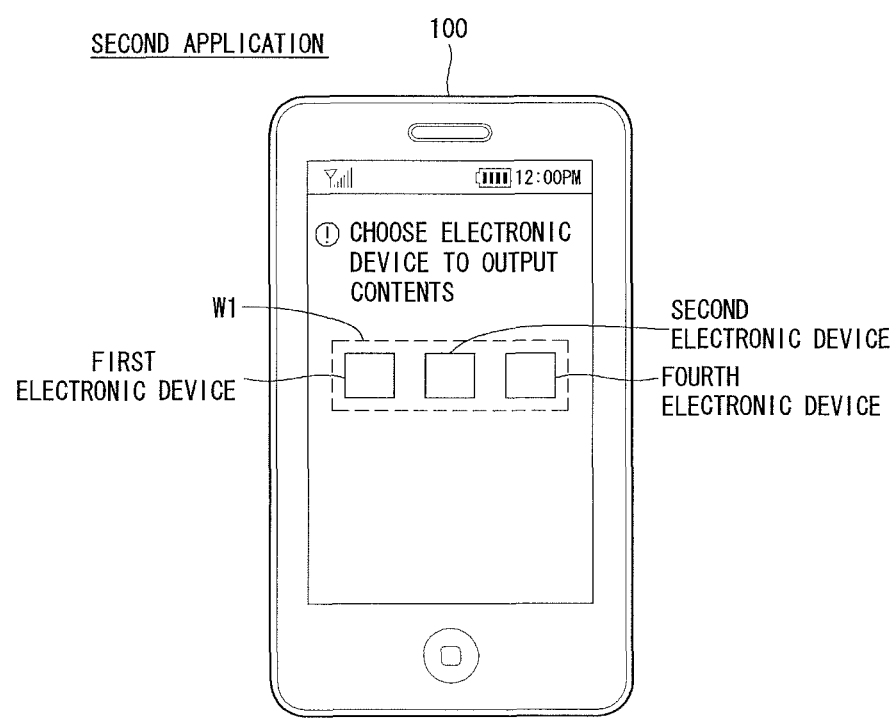
FIG. 9 illustrates a user interface of a second application according to the first embodiment of this document.
Figure 10:
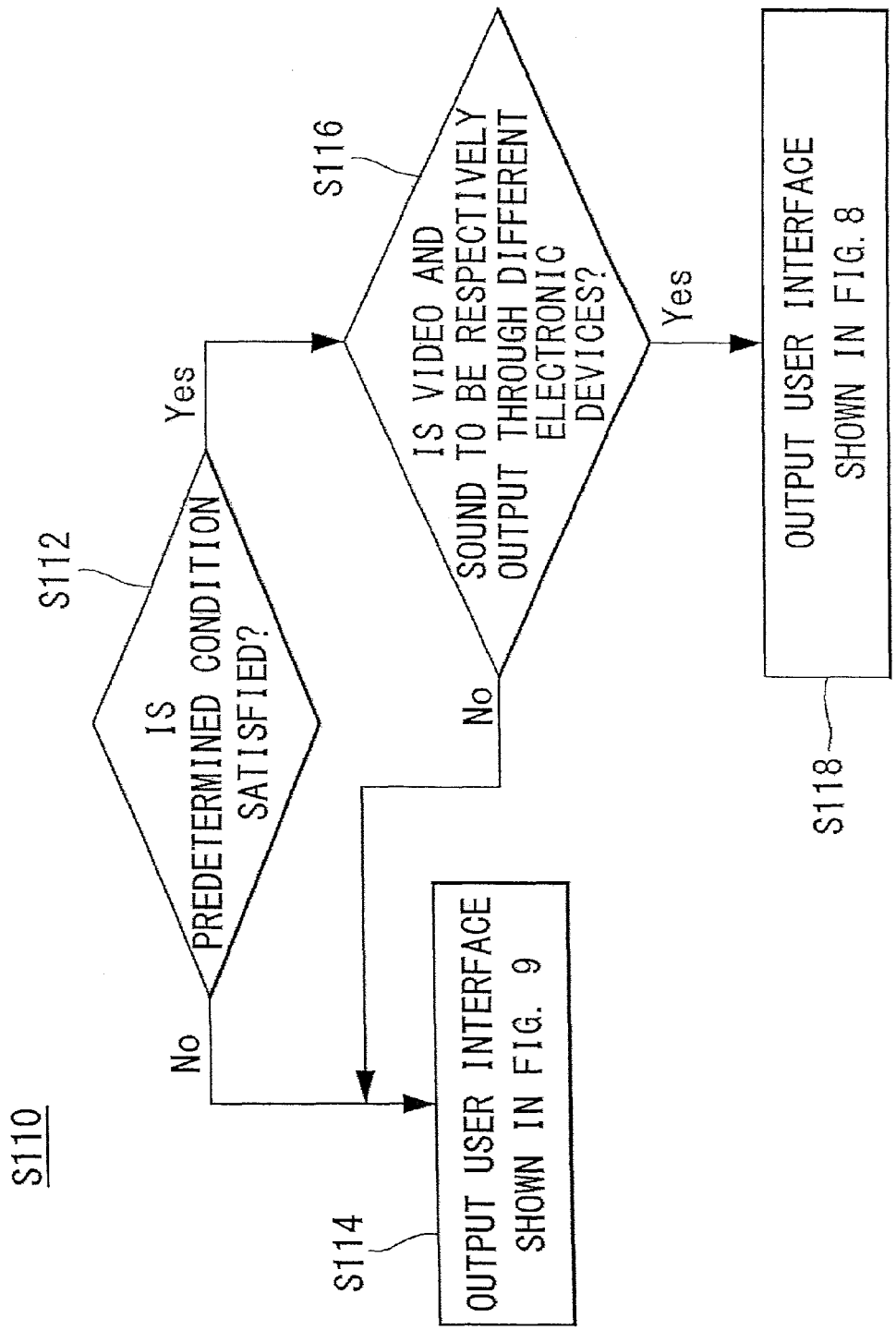
FIG. 10 is a flowchart for explaining a second event according to the first embodiment of this document.
Figure 11:
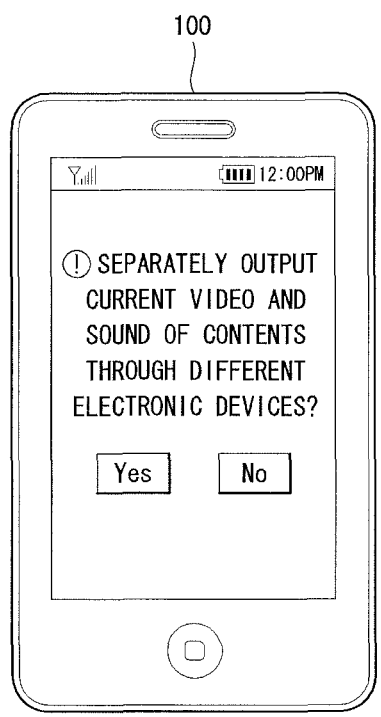
FIG. 11 illustrates a user interface inquiring whether to output a video and a sound in respectively different electronic devices according to the first embodiment of this document.
Figure 12:
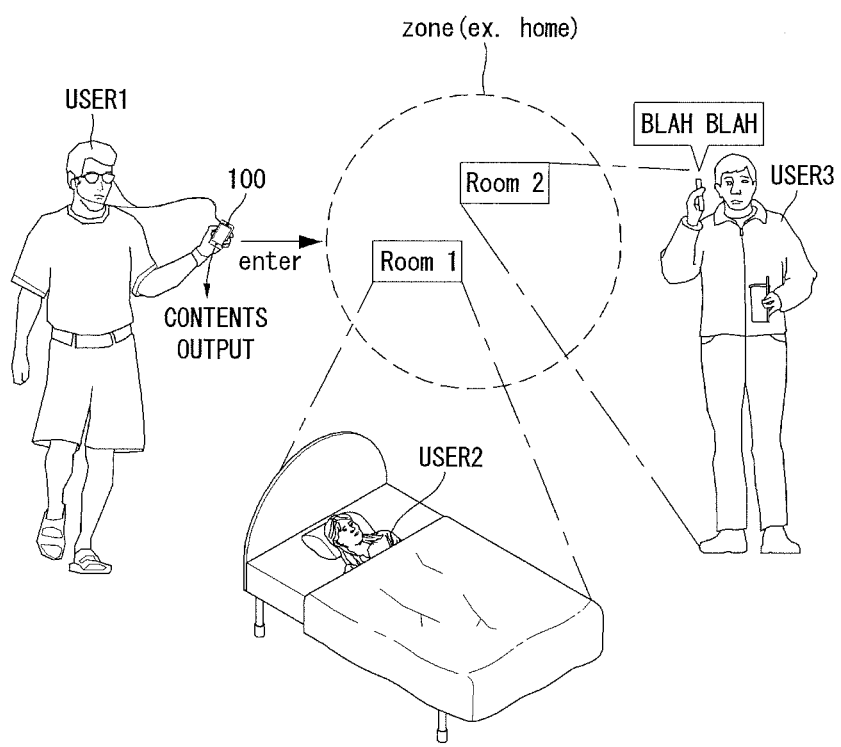
FIGS. 12 and 13 are diagrams for explaining predetermined conditions according to the first embodiment of this document.
Figure 13:
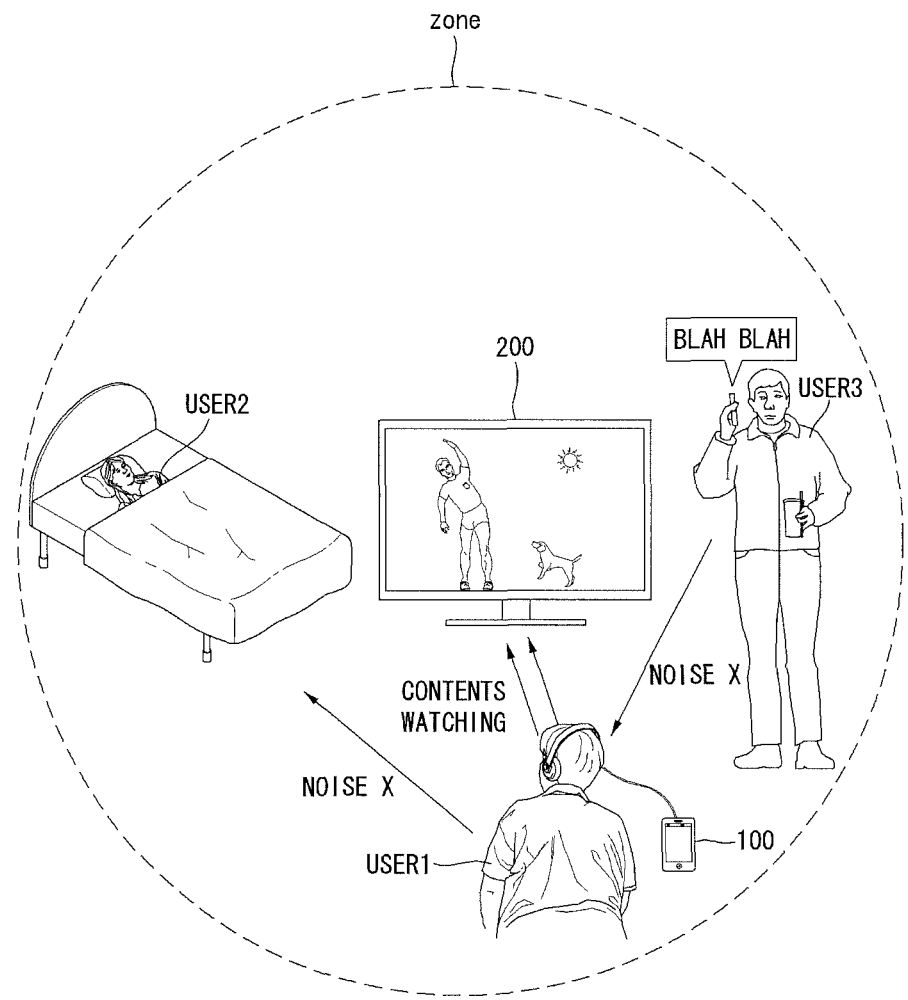

FIG. 9 illustrates a user interface of a second application according to the first embodiment of this document, and FIG. 10 is a flowchart for explaining the second event according to the first embodiment of this document. FIG. 11 illustrates a user interface inquiring whether to respectively output a video and a sound through different electronic devices according to the first embodiment of this document, and FIGS. 12 and 13 are diagrams for explaining predetermined conditions according to the first embodiment of this document.

While the first event is generated through the first application for selecting electronic devices for respectively outputting the video and the sound, the second event is generated through a second application for outputting contents, which are currently being output, through another electronic device.

Referring to FIG. 7, a user may execute the second application through interaction with the first electronic device 100. The second application is an application for selecting an electronic device which is to output the contents.

In a case where the second application is executed, the first electronic device 100 may output a user interface as shown in FIG. 9. Referring to FIG. 9, a user may specify which electronic device is to output contents, through a user interface according to the execution of the second application. When the user selects a specific electronic device through the second application, the contents may be output through the selected electronic device.

In this case where the user executes the second application, the first electronic device 100 may find out the user's intention and determine whether or not the user wants a sound and a video to be separately output through different electronic devices. This will now be described in detail with reference to FIG. 10.

Referring to FIG. 10, in operation 5112, when the second application is executed, the first electronic device 100 may determine whether or not a predetermined condition is satisfied in operation S112.

The predetermined condition may include any situation in which outputting a video and a sound separately through different electronic devices conforms to a user's intention.

For example, it is assumed that as shown in FIG. 12, a user 1 enters a predetermined zone, for example, home while watching contents. When the user 1 enters home, the user 1 may want to watch the contents using the second electronic device 200 having a wider screen than that of the first electronic device 100. However, as shown in the drawing, if a user 2 is sleeping in a room 1, outputting the contents through the second electronic device 200 may disturb sleep of the user 2. Also, if a user 3 is talking in a loud voice in room 2, watching the contents through the second electronic device 200 may be disturbed.

In this case, if only a video of the contents is output through the second electronic device 20 while a sound of the contents is output through an earphone of the first electronic device 100 as shown in FIG. 13, the user 1 may watch the contents without disturbing sleep of the user 2, and without being disturbed by the conversation the user 3 is having.

In this manner, in the case where the first electronic device 100 enters a predetermined zone, separately outputting the video and the sound in different electronic devices may conform to the user's intention.

At this time, the first electronic device 100 may determine the entrance to the predetermined zone by using various methods. For example, the first electronic device 100 may determine the entrance to the predetermined zone through NFC, camera recognition, current location information or the like.

When the entrance to the predetermined zone is determined through NFC, an NFC module (not shown) included in the first electronic device 100 is tagged to an NFC tag installed in the predetermined zone, thus determining that the first electronic device 100 has entered the predetermined zone. At this time, the tag installed in the predetermined zone may be an electronic key, for example.

When the entrance to the predetermined zone is determined through camera recognition, the entrance to the predetermined zone is determined through a camera module of the first electronic device 100. Alternatively, a camera module installed in the predetermined zone recognizes the first electronic device 100 or a user of the first electronic device 100, thus determining that the first electronic device 100 has entered the predetermined zone and sending a related control signal to the first electronic device 100.

The determination as to the entrance to the predetermined zone using current location information may be performed by determining whether or not the current location of the first electronic device 100 is within the predetermined zone.

Also, there may be various predetermined conditions other than the entrance to the predetermined zone. For example, the predetermined condition may include at least one of a case in which a predetermined location is satisfied, a case in which a level of ambient noise is lower than a predetermined first reference level or higher than a predetermined second reference level, a case in which a sound is output through an earphone, and a case in which the time is within a specific time zone.

Since the case associated with the predetermined location, which is one example of the predetermined condition, corresponds to the entrance to the predetermined zone, a description thereof will be omitted.

Hereinafter, a description will be made on the case where a level of ambient noise is lower than the first reference level. If contents are output through only the second electronic device 200 even when the level of ambient noise is lower than the predetermined first reference level, this is to prevent the sound of the contents from disturbing the surroundings. That is, in this case, a video may be output through the second electronic device 200 while a sound is output through an earphone of the first electronic device 100 as described above. Furthermore, if the contents are output through only the second electronic device 200 despite the ambient noise level higher than the predetermined second reference level, this is to prevent ambient noise from interfering with watching the contents.

Hereinafter, the case where a sound is output through an earphone, which is one example of the predetermined condition, will now be described. If the first electronic device 100 is outputting the sound of the contents through a wired/wireless earphone, there is a high possibility that a user's intention is to continuously watch the contents through the first electronic device 100. Accordingly, in the case where the first electronic device 100 outputs the sound of the contents through the earphone, this may be considered to coincide with the predetermined condition.

Hereinafter, the specific time zone, which is one example of the predetermined condition, will be described. Outputting the contents through an external speaker may disturb the surroundings especially early in the morning and/or in the late hours. Thus, if the time belongs to the specific time zone, this may be considered to coincide with the predetermined condition.

In the above description, examples of the predetermined condition have been described.

When it is determined that the predetermined condition is not satisfied, the first electronic device 100 may output a user interface shown in FIG. 9 in operation S114. Accordingly, the user may control the contents currently being output through the first electronic device 100 to be output through another electronic device. In this case, the first electronic device 100 determines that the situation does not correspond to a predetermined event.

When it is determined that the predetermined condition is satisfied, the first electronic device 100 may determine whether to separately output a sound and a video through different electronic devices in operation S116.

In this case, in order to more clearly find out the user's intention, a user interface as shown in FIG. 11 may be output.

When a selection corresponding to 'No' is received through the user interface shown in FIG. 11, the first electronic device 100 outputs the user interface shown in FIG. 9 so that an electronic device which is to output the contents can be selected. In this case, the first electronic device 100 only controls the contents to be output through the selected electronic device, and thus this is not determined as a predetermined event.

Meanwhile, when a selection corresponding to 'Yes' is received through the user interface shown in FIG. 11, the first electronic device may allow the video and the sound of the contents being output to be separately output through different electronic device even when the second application is executed. This is because the user's intention to separately output the video and the sound of the contents through different electronic devices is obvious.

In operation S118, the first electronic device 100 may receive a selection regarding electronic devices to respectively output the video and the sound by outputting the user interface shown in FIG. 8.

When respective electronic devices to output the video and the sound are selected through the second application as described above, the first electronic device 100 determines this situation to be the second event.

Hereinafter, the third event will be described.

While the first and second events are generated when a user executes a specific application, the third event is associated with selecting different electronic devices to respectively output the sound and the video when a predetermined condition is satisfied even without a user's executing a specific application.

The predetermined condition is as described above. That is, the predetermined condition may include at least one of the case where the first electronic device 100 enters a predetermined zone, the case where the first electronic device is positioned in a specific location, the case where a level of ambient noise is higher than a predetermined first reference value or lower than a predetermined second reference value, the case where a sound is output through an earphone, and the case where the time is within a specific time zone.

When the predetermined condition is satisfied, the first electronic device 100 may output a user interface asking whether to output the video and the sound through different electronic devices, respectively (see the user interface shown in FIG. 11).

Furthermore, when the predetermined condition is satisfied, the first electronic device 100 may output a user interface for selecting an electronic device to output the video and an electronic device to output the sound (see the user interface shown in FIG. 8). In particular, in a case where a user selects different electronic devices for the video and the sound, the first electronic device 100, may output a user interface for selecting an electronic device to output the video and an electronic device to output the sound.

In such a manner, a user may select electronic devices to respectively output the video and the sound.

As described above, when the predetermined condition is satisfied and electronic devices are selected to separately output the video and the sound, the first electronic device 100 determines this situation to be the third event.

Meanwhile, in the above description regarding the first to third events, the first electronic device 100 allows the user to select respective electronic devices to output the video and the sound. However, electronic devices to respectively output the video and the sound may be selected automatically according to a predetermined algorithm or may be determined in advance by the user.

In the above description, the first event, the second event, and the third event, which are examples of the predetermined event, have been explained.

Referring back to FIG. 5, in operation S120, when the predetermined event occurs, the first electronic device 100 may control the video and the sound to be output through different electronic devices, respectively.

Hereinafter, the operation S120 will be described in more detail with reference to FIG. 14.

Figure 14:
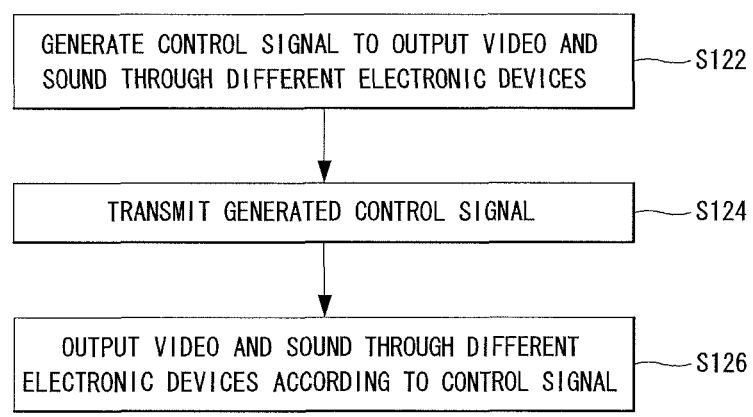
FIG. 14 is a flowchart for specifically explaining operation S120 according to the first embodiment of this document.

FIG. 14 is a flowchart for explaining the operation S120 according to the first embodiment of this document.

The first electronic device 100 may generate a control signal so as to output the video and the sound of the contents through different electronic devices, and allow the different electronic devices to respectively output the video and the sound according to the generated control signal.

In operation S122, the first electronic device 100 may generate a control signal such that the video and the sound are output through different electronic devices, respectively.

As is assumed above, when a predetermined event occurs, the contents being output from the first electronic device 100 need to be controlled such that the video of the contents is output through the second electronic device 200 and the sound of the contents is output through the first electronic device 100. Accordingly, the control signal controls the video of the contents to be output through the second electronic device 200, and controls the sound of the contents to be output through the first electronic device 100.

The first electronic device 100 may transmit the generated control signal to a corresponding electronic device in operation S124. Also, according to the control signal, the video may be output through the second electronic device 200 and the sound may be output through the first electronic device 100 in operation S126.

The operation S124 may be variously implemented according to how the video and the sound are provided to electronic devices outputting the video and the sound.

The operation S124 will now be described in detail with reference to FIGS. 15 to 17.

Figure 15:
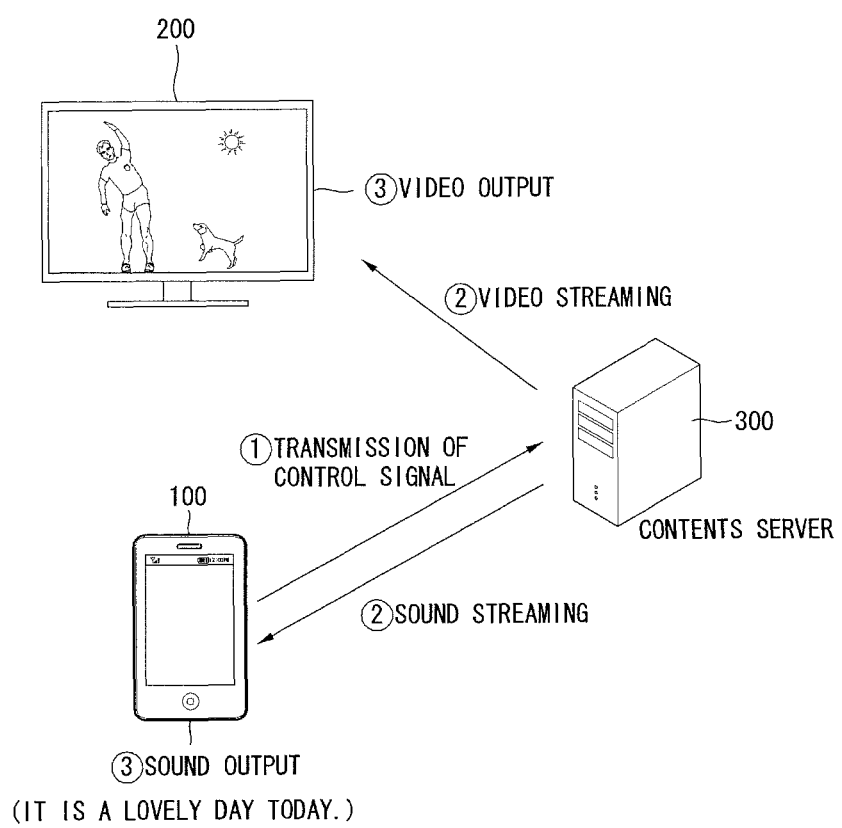
FIGS. 15 through 17 are diagrams for explaining a control signal according to the first embodiment of this document.
Figure 16:
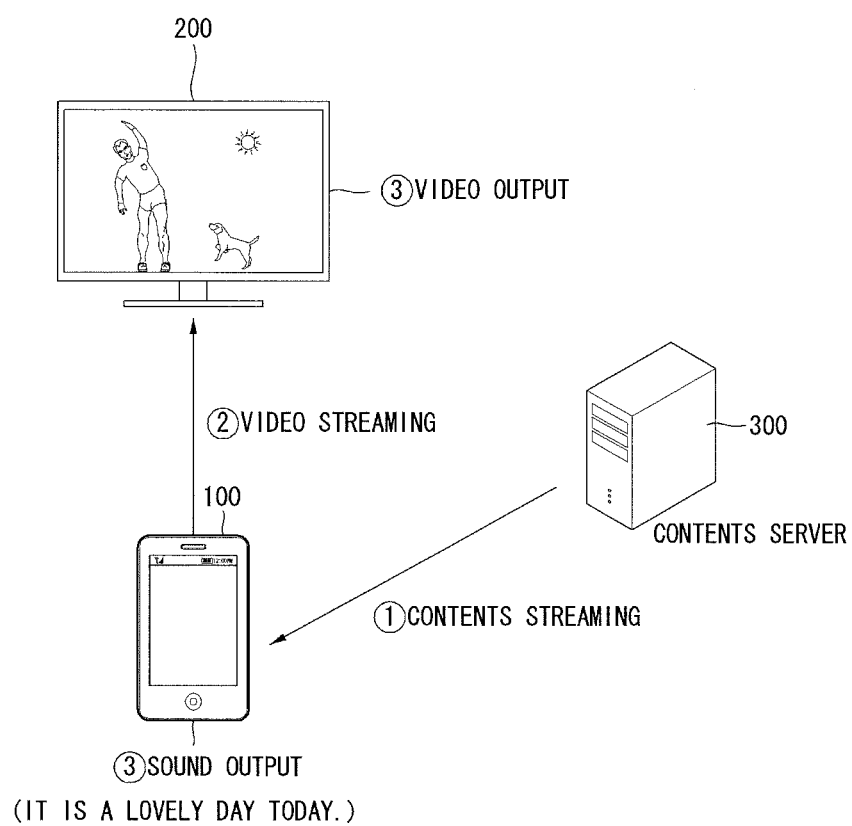
Figure 17:
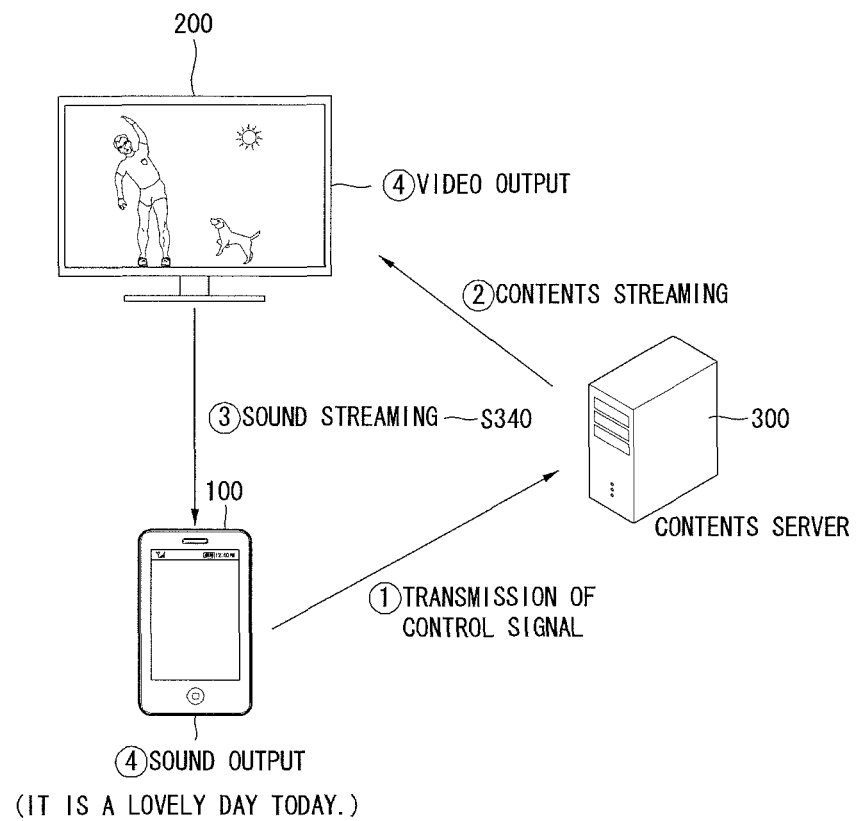

FIGS. 15 to 17 are diagrams for explaining a control signal according to the first embodiment of this document.

Referring to FIG. 15, the first electronic device 100 may transmit the generated control signal to the third electronic device 300 which is a contents provider server. The third electronic device 300 receiving the control signal may stream only the sound of the streaming contents to the first electronic device 100 while streaming the video of the contents to the second electronic device 200 according to the control signal. In this manner, the first electronic device 100 can output the sound while the second electronic device 200 can output the video.

Referring to FIG. 16, the first electronic device 100 receives the streaming of contents from the third electronic device 300, and may stream the video of the contents to the second electronic device 200 according to the generated control signal. Thus, the second electronic device 200 can output the video while the first electronic device 100 can output the sound.

Referring to FIG. 17, the first electronic device 100 may send the generated control signal to the third electronic device 300. The third electronic device 300 having received the control signal may transmit the contents to the second electronic device 200 according to the control signal. At this time, the third electronic device 300 may also instruct the second electronic device 200 to separately output the sound and the video of the contents. Accordingly, the second electronic device 200 may stream the sound of the contents to the first electronic device 100. In such a manner, the second electronic device can output the video while the first electronic device can output the sound.

Hereinafter, the operation S126 will be described in more detail with reference to FIG. 18.

Figure 18:
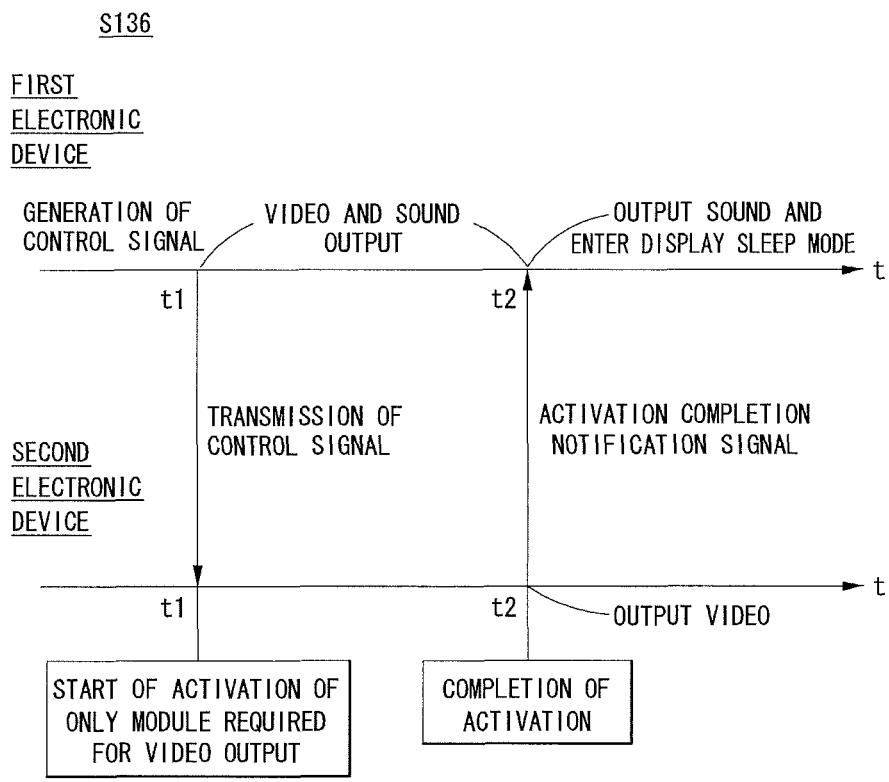
FIG. 18 is a diagram for specifically explaining operation S126 according to the first embodiment of this document.

FIG. 18 is a diagram for specifically explaining the operation S126 according to the first embodiment of this document.

When the first electronic device 100 wants to allow the second electronic device 200 to output the video of the contents, the second electronic device 200 may not be ready to output the video of the contents. For example, the second electronic device 200 may be in an off state.

Accordingly, when the video and the sound need to be separately output (at a time point t1), the first electronic device 100 may send a video output request signal, namely, a control signal, to the second electronic device 200. When receiving the video output request signal, the second electronic device 200 may enter a power-on state.

At this time, the second electronic device 200 may operate to turn on only required modules, for example, a video processing module and a communication module in order to save power. Meanwhile, since the second electronic device 200 is in an off state, the first electronic device 100 continuously outputs the video and the sound even after a time point t1 at which the user makes a request to separate the video and the sound from each other. The second electronic device 200, after completely activating the modules, may send an activation-completion notification signal to the first electronic device 100 (at a time point t2). The first electronic device 100, when receiving the activation-completion notification signal from the second electronic device 200, outputs only the sound while allowing the second electronic device 200 to output the video. Also, when outputting only the sound, the first electronic device 100 may execute a display sleep mode, for example, dimming, in order to reduce power consumed by the display.

According to the method described with reference to FIG. 18, the first electronic device 100 may wait for the second electronic device 200 to be ready for video output, and allow the second electronic device 200 to output the video when it is ready for the video output.

In such a manner, the user can be prevented from being provided with only the sound from the first electronic device 100 between the time points t1 and t2 shown in FIG. 18 without watching the video through the second electronic device 200.

Also, after the time point t2 shown in FIG. 18, the video is output through the second electronic device 200, and the sound is output through the first electronic device 100. At this time, the video and the sound need to be synchronized. This is because different hardware environments of the first electronic device 100 and the second electronic device 200 may cause failure in synchronization between the video and the sound.

Figure 19:
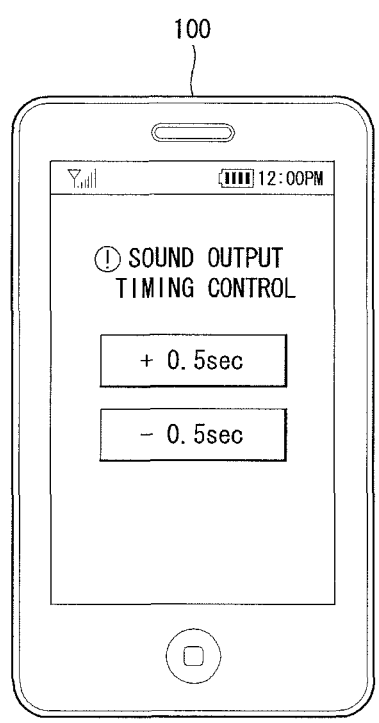
FIG. 19 illustrates a user interface for synchronization according the first embodiment of this document.

In order to prevent this, at least one of the first electronic device 100 and the second electronic device 200 may perform control for synchronization between the video and the sound. In more detail, at least one of the first electronic device 100 and the second electronic device 200 may provide a user interface for synchronization. For example, as shown in FIG. 19, the first electronic device 100 may provide a user interface to set the output timing of the sound. In such a manner, synchronization between the sound output through the first electronic device 100 and the video output through the second electronic device 200 can be achieved.

Alternatively, the first electronic device 100 and the second electronic device 200 may exchange synchronization signals.

For example, the first electronic device 100 may acquire time information of the sound being output and transmits the acquired time information to the second electronic device 200. Also, the second electronic device 200 may determine the extent to which the video and the sound are synchronized, by comparing the received time information with time information of the video being output. For more accurate determination, the second electronic device 200 may additionally consider the transmission duration of the received time information. When it is determined that the synchronization fails, the second electronic device 200 may control the video output timing or may request control upon sound output timing from the first electronic device 100. In this manner, the sound being output from the first electronic device 100 and the video being output from the second electronic device can be synchronized.

Referring back to FIG. 5, when an integration event is generated with respect to the sound and the video being respectively output through different electronic devices, the video and the sound may be controlled to be output through a single electronic device in operation S130.

The operation S130 is to allow the video and the sound to be output through a single electronic device, for example, the first electronic device 100, when the integration event occurs while the first electronic device 100 outputs the sound and the second electronic device 200 outputs the video.

The integration event may include various situations where outputting the sound and the video through a single electronic device conforms to the user's intention.

For example, the integration event may include at least one of a case where the first electronic device 100 moves more than a predetermined distance, and a case where the integration event is requested through a user interface. Hereinafter, each of the aforementioned cases will be described in detail.

The case where the first electronic device moves more than the predetermined distance, which is one example of the integration event, may refer to a case where a user who is watching the video through the second electronic device 200 in room 1 moves to room 2, bringing the first electronic device 100 with him. In this case, since the user is unable to watch the video through the second electronic device 200, the video may be output through the first electronic device 100 which is outputting the sound.

In order to determine whether or not the first electronic device 100 moves more than the predetermined distance, the first electronic device 100 may calculate and acquire the moving distance by using an acceleration sensor installed inside the first electronic device 100. Alternatively, a camera sensor may be used. For example, if the user being recognized by a camera mounted on the second electronic device 200 disappears at some point, this may be considered to be the occurrence of the integration event. Alternatively, if the first electronic device 100 moves and then performs NFC tagging at a different location, the first electronic device 100 may determine that the user has moved more than the predetermined distance and consider this as the occurrence of the integration event.

The user interface, which is another example of the integration event, may refer to a case where the user requests the first electronic device 100 to output the video currently output through the second electronic device 200.

Hereinafter, a method for outputting the video and the sound again through the first electronic device will be described. Since the method corresponds to a method for outputting both the video and the sound through the second electronic device, a description thereof will be omitted.

Figure 20:
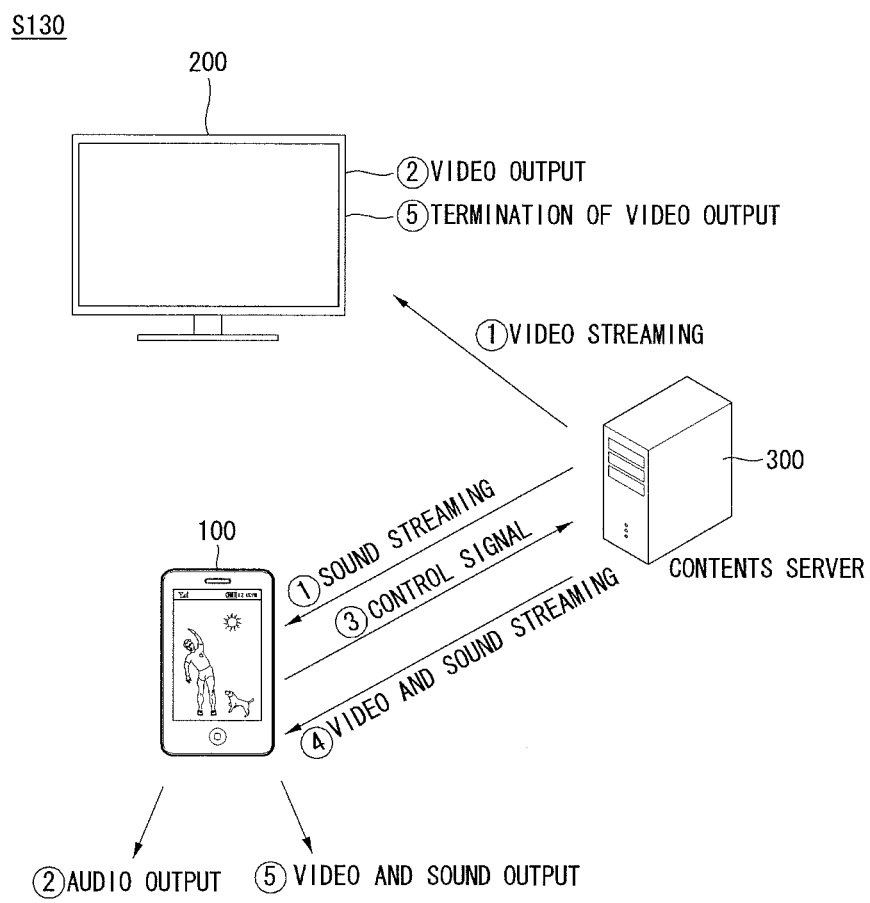
FIGS. 20 through 22 are diagrams for explaining an integration event according to the first embodiment of this document.
Figure 21:
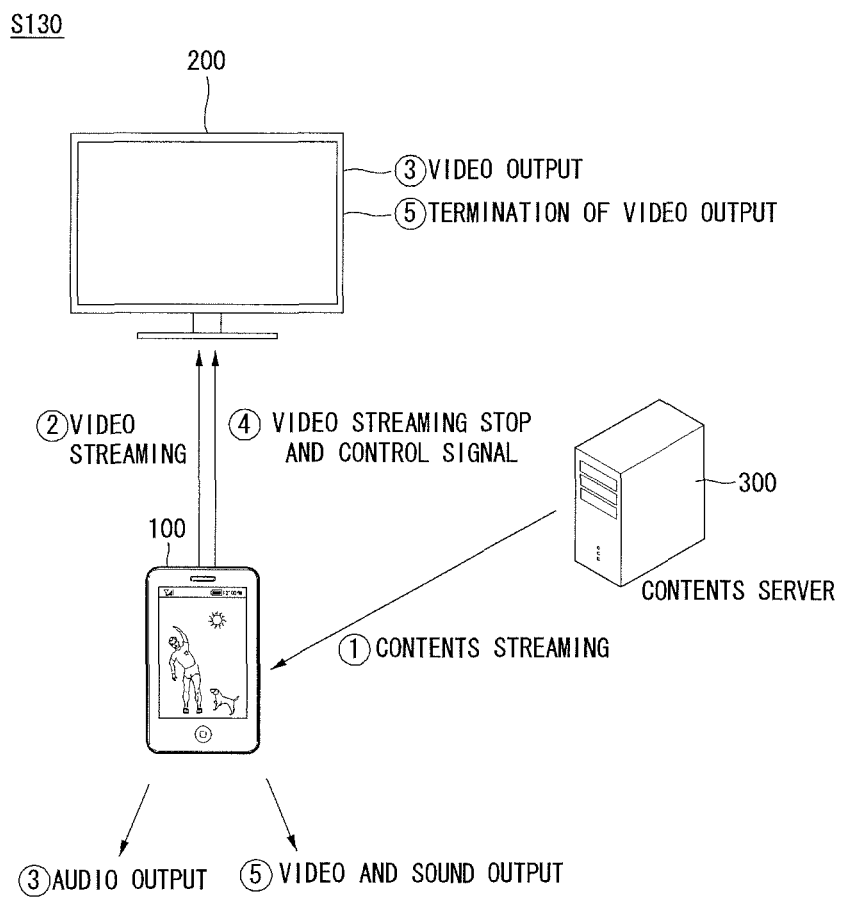
Figure 22:
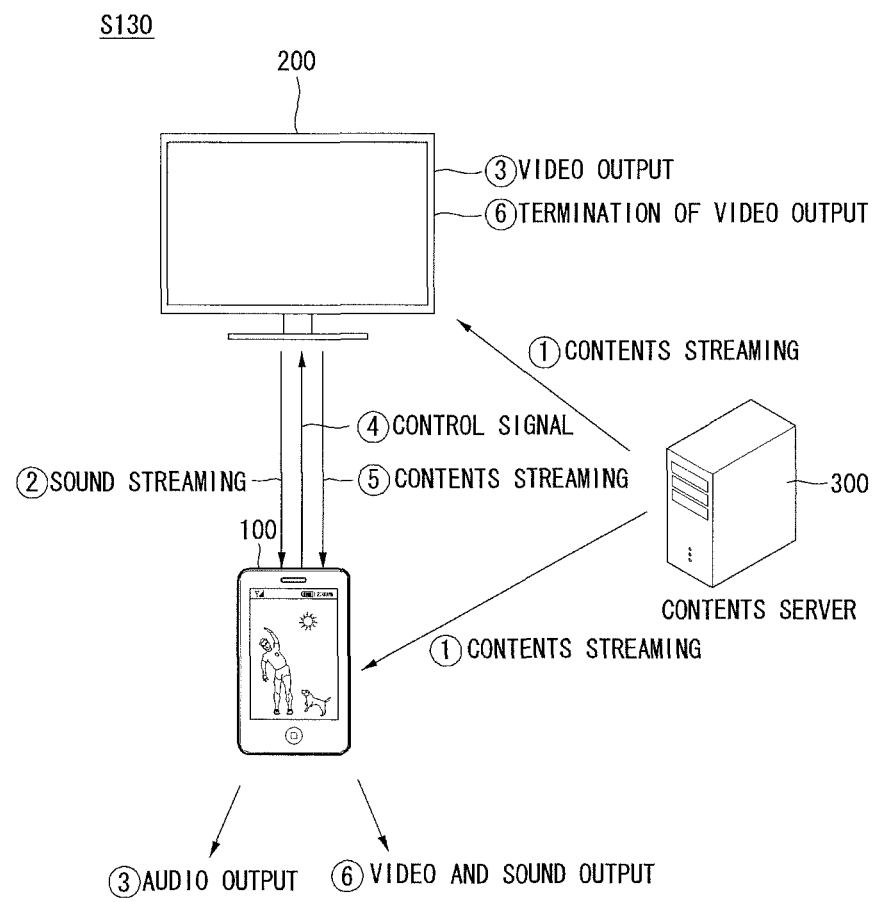

FIGS. 20 through 22 are diagrams for explaining the integration event according to the first embodiment of this document.

Referring to FIG. 20, the first electronic device 100 receives streaming of the sound from the third electronic device 300 and outputs the sound, while the second electronic device 200 receives streaming of the video from the third electronic device 300 and outputs the video. That is, this corresponds to the embodiment described above with reference to FIG. 15.

When the integration event occurs in the above state, at least one of the first electronic device 100 and the second electronic device 200 may generate a control signal according to the occurrence of the integration event, and transmit the generated control signal to the third electronic device 300.

The third electronic device 300 having received the control signal may stop video streaming to the second electronic device 200 and provide the streaming of the video, as well as the sound, to the first electronic device 100.

Accordingly, the first electronic device 100 outputs both the video and the sound, while the second electronic device 200 stops outputting the video.

Referring to FIG. 21, the first electronic device 100 receives the streaming of the video and the sound from the third electronic device 300, and then provides the streaming of the video to the second electronic device 200, so that the first electronic device 100 outputs the sound while the second electronic device 200 outputs the video. That is, this corresponds to the embodiment described above with reference to FIG. 16.

If the integration event occurs in such a state, the first electronic device 100 may transmit a control signal, requesting the second electronic device 200 to stop outputting the video, according to the occurrence of the integration event.

The second electronic device 200 stops outputting the video as it receives the control signal.

As a result, the first electronic device 100 may output both the video and the sound.

Referring to FIG. 22, the second electronic device 200 receives the streaming of the video and the sound from the third electronic device 300. The second electronic device 200 may stream the sound of the received video and sound to the first electronic device 100. In this manner, the first electronic device 100 outputs the sound while the second electronic device 200 outputs the video. That is, this corresponds to the embodiment described above with reference to FIG. 17.

If the integration event occurs in such a state, the first electronic device 100 may generate a control signal according to the occurrence of the integration event and transmit the generated control signal to the second electronic device 200.

The second electronic device 200 may stream the contents to the first electronic device 100 as it receives the control signal. Also, the second electronic device 200 may stop outputting the video.

The first electronic device 100 may output both the video and the sound through the streaming of the contents received from the second electronic device 200.

Meanwhile, when the integration event occurs, the first electronic device 100 transmits a control signal to the third electronic device 300, thus directly receiving the streaming of the contents from the third electronic device 300.

In the above, the method of outputting the video and the sound again through the first electronic device has been described so far.

The above description is made on the assumption that the second electronic device 200 stops outputting the video. However, of course, the second electronic device 200 may continuously output the video even if the first electronic device 100 outputs both the video and the sound.

Furthermore, the indication of order in FIGS. 20 through 22 is merely for ease of a description, and the embodiment of this document is not limited thereto. That is, the embodiment of this document may be implemented without being limited to the order depicted in FIGS. 20 through 22.

In the above, the operating method of an electronic device according to the first embodiment of this document has been described so far. The operating method of the electronic device according to the first embodiment of this document significantly improves the user's immersion for the contents.

For example, the user of the first electronic device 100 watches the contents while walking down the road, and then arrives home, which is one example of the predetermined zone, at 11 p.m., which is a specific time zone. As a result, the user may watch the video using the second electronic device 200 having a wider screen than that of the first electronic device 100 while listening to the sound using an earphone of the first electronic device, so that the user does not disturb sleep of family members.

Hereinafter, an operating method of an electronic device according to a second embodiment of this document will be described with reference to FIG. 23.

Figure 23:
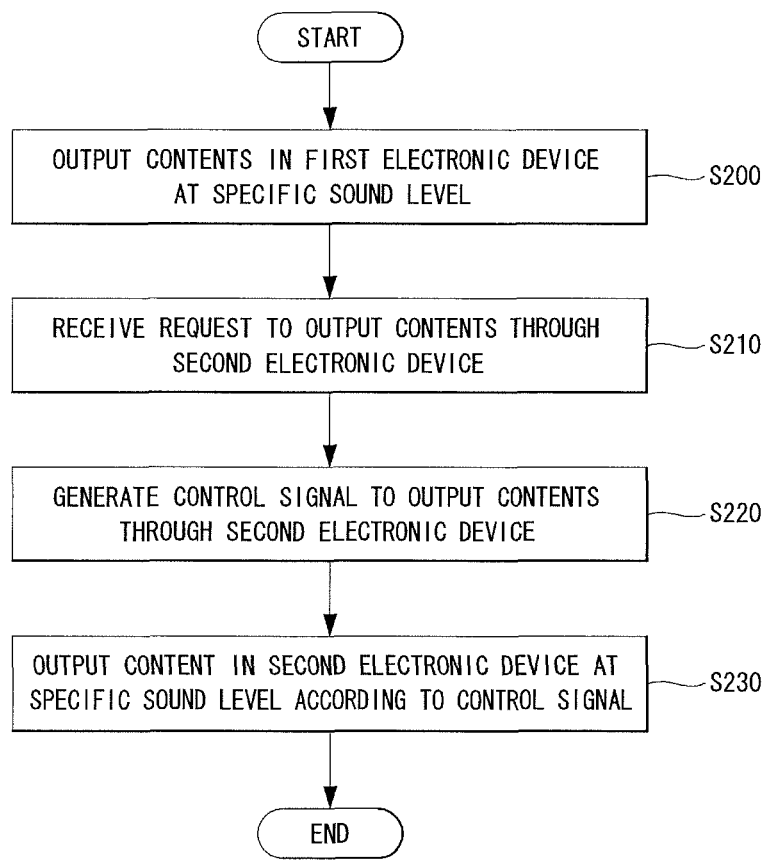
FIG. 23 is a flowchart for explaining an operating method of an electronic device according to a second embodiment of this document.

FIG. 23 is a flowchart for explaining the operation method of an electronic device according to a second embodiment of this document.

According to the second embodiment of this document, while the first electronic device 100 is outputting contents, the second electronic device 200 may participate in the outputting of the contents. Even in this case, the second electronic device 200 may provide the same environment for contents provision as that of the first electronic device 100. For example, if the second electronic device 20 is made to output the contents while the first electronic device 100 is outputting the contents at a specific sound level, the second electronic device 200 outputs the contents considering the specific sound level. Thus, the user is provided with a seamless environment for contents provision. Hereinafter, an implementation method of the second embodiment will be described.

In describing the second embodiment of this document, a description of constituents corresponding to those of the first embodiment will be omitted.

Referring to FIG. 23, the first electronic device 100 may output contents at a specific sound level in operation S200.

As in the operation S100 described above with reference to FIG. 5, the first electronic device 100 may output a variety of contents. At this time, the first electronic device 100 may output contents at a specific sound level.

The first electronic device 100 may receive a request to output the contents through another electronic device while outputting the contents in operation 5210.

For example, the first electronic device 100 may allow another electronic device to be selected to output the contents through the second application (see FIGS. 7 and 9) described above in the first embodiment. For convenience of a description, it is assumed that the second electronic device 200 is selected as another electronic device to output the contents.

The first electronic device 100, when receiving a request to output the contents, which is currently being output through the first electronic device 100, through another electronic device, may generate a control signal so as to make the second electronic device 200 output the contents in operation S220.

Figures 24, 25:
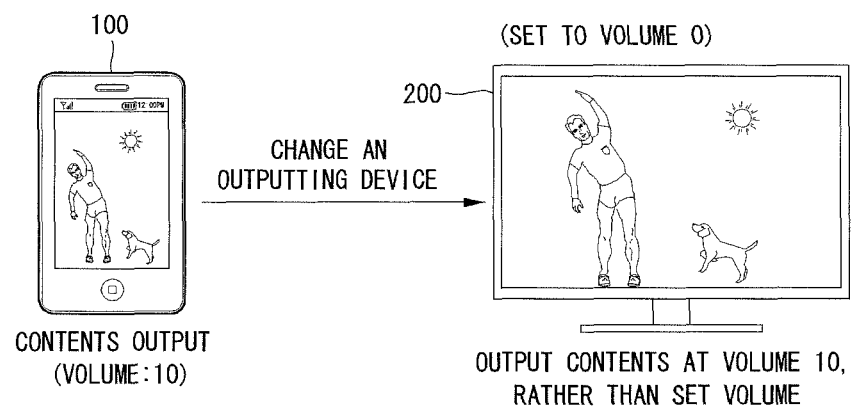
FIG. 24 illustrates a message format of a control signal according to a second embodiment of this document.
FIG. 25 illustrates an example of the implementation of a second embodiment of this document.

FIG. 24 illustrates a message format of the control signal according to the second embodiment of this document.

As shown in FIG. 24, the control signal may include a command code and a payload.

The command mode may include a command value for outputting specific contents. In this case, the command value may include source information of the content that the first electronic device 100 is outputting, for example, an IP address. This is to allow the second electronic device 200 to directly receive streaming of the contents. On the other hand, in a case where the first electronic device 100 directly streams the contents to the second electronic device 200, the source information may be selective information.

Also, the payload may include information regarding a sound level of the contents output from the first electronic device 100. Based on the information included in the payload, the second electronic device 200 may control the sound level of the contents being output so as to correspond to the sound level of the first electronic device 100.

The first electronic device 100 may send the generated control signal to the second electronic device 200.

The second electronic device 200 may output the contents at the specific sound level according to the received control signal in operation S230.

In more detail, the second electronic device 200, when receiving the command code including the control signal, may prepare for content output. For example, the second electronic device 200 may turn on a module required to output contents. Also, in a case where the second electronic device 200 directly receives streaming from the first electronic device 100 or where source information is included in the command code, the second electronic device 200 may receive streaming of the contents, currently being output through the first electronic device 100, based on the source information.

The second electronic device 200, when receiving streaming of the contents, may control the sound level of the contents on the basis of the payload. That is, the second electronic device 200 may control the sound level of the contents to correspond to the sound level in the first electronic device 100.

Thus, even when a device for outputting contents is changed, a user can be provided with the sound of the contents at a constant sound level.

FIG. 25 illustrates an implementation example of the second embodiment of this document.

As shown in FIG. 25, the first electronic device 100 outputs contents at volume 10, and the second electronic device 200 is muted at volume 0. In this case, when there is a request to output the contents, which is currently being output through the first electronic device 100, through the second electronic device 200, the second electronic device 200 outputs the contents at the output volume 10 set in the first electronic device 100, rather than the output volume 0 set in the second electronic device 200.

Of course, if the second electronic device 200 is made to output the contents while the first electronic device 100 is in a mute state, the second electronic device 200 may output the contents in a mute state even if the volume set in the second electronic device 200 is not muted.

Accordingly, according the second embodiment, an environment enabling a continuous content play mode is provided.

Meanwhile, in describing the second embodiment, the case where a device for outputting contents is changed from the first electronic device 100 to the second electronic device 200 has been described so far. However, even in a case where the second electronic device 200 is added to the first electronic device 100 as a device to output contents, the sound level of the second electronic device 200 may be controlled to correspond to the sound level of the first electronic device 100.

As set forth above, in the electronic device and the operating method of the electronic device according to the embodiments, when a predetermined event occurs, a sound and a video of contents being output are controlled to be separately output through different electronic devices, thus providing the optimized environment for contents provision to a user.

In the electronic device and the operating method of the electronic device according to the embodiments, if contents being output at a specific sound level through the first electronic device are controlled to be output through the second electronic device, the second electronic device also outputs the contents in consideration of the specific sound level, thus providing continuity in terms of sound.

Various embodiments disclosed in this document may be embodied individually or in combination. Operations constituting each embodiment may be embodied in combination with operations constituting another embodiment.

The above described data processing method in a mobile terminal with a touch screen according to the present invention can be written as computer programs and can be implemented in digital computers that execute the programs using a computer readable recording medium. The data processing method in a mobile terminal with a touch screen according to embodiments of the present invention can be executed through software. The software can include code segments that perform required tasks. Programs or code segments can also be stored in a processor readable medium and transmitted.

The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electronic device comprising:
a communication unit; and
a control unit configured to:
control a first electronic device to output content including video data and audio data;
detect occurrence of a predetermined event related to output of the content; and
based on detection of the predetermined event related to output of the content, control separate output of the video data and the audio data on different electronic devices by:
controlling the first electronic device to output one of the video content data or the audio data, and
controlling, using the communication unit, a second electronic device to output the other of the video data or the audio data that is not output from the first electronic device, the second electronic device being separate from the first electronic device,
wherein the different electronic devices are recognized by the electronic device according to a predetermined protocol.

2. The electronic device of claim 1, wherein the control unit is configured to detect occurrence of the predetermined event by:
executing a first application that allows selection of the first electronic device to output the video data and selection of the second electronic device to output the audio data; and
based on execution of the first application, detecting selection of the first electronic device to output the video data and selection of the second electronic device to output the audio data.

3. The electronic device of claim 2, wherein executing the first application that allows selection of the first electronic device to output the video data and selection of the second electronic device to output the audio data comprises controlling display of a user interface that allows a user to select the first electronic device to output the video data and select the second electronic device to output the audio data.

4. The electronic device of claim 1, wherein the control unit is configured to detect occurrence of the predetermined event by:
executing a second application configured to output the content through another electronic device; and
based on execution of the second application, selecting the first electronic device to output the video data and selecting the second electronic device to output the audio data.

5. The electronic device of claim 4, wherein executing the second application configured to output the content through another electronic device comprises:
determining whether a predetermined condition is satisfied when the second application is executed; and
based on determining that the predetermined condition is satisfied, controlling display of a first user interface that solicits input of whether a user desires to output the video data and the audio data separately, through the different electronic devices.

6. The electronic device of claim 4, wherein executing the second application configured to output the content through another electronic device comprises:
determining whether a predetermined condition is satisfied when the second application is executed; and
based on determining that the predetermined condition is satisfied, controlling display of a second user interface that allows a user to select the first electronic device to output the video data and select the second electronic device to output the audio data.

7. The electronic device of claim 1, wherein the control unit is configured to detect occurrence of the predetermined event by:
determining whether a predetermined condition is satisfied; and
based on determining that the predetermined condition is satisfied, selecting the first electronic device to output the video data and selecting the second electronic device to output the audio data.

8. The electronic device of claim 7, wherein determining whether the predetermined condition is satisfied comprises at least one of determining whether the first electronic device enters a predetermined zone, determining whether the first electronic device is located in a predetermined location, determining whether a level of ambient noise is lower than a predetermined first reference value or higher than a predetermined second reference value, determining whether the audio data is output through an earphone, or determining whether a current time corresponds to a specific time zone.

9. The electronic device of claim 7, wherein the control unit is configured to, based on determining that the predetermined condition is satisfied, control display of a first user interface that solicits input of whether a user desires to output the video data and the audio data separately, through the different electronic devices.

10. The electronic device of claim 9, wherein the control unit is configured to, based on a request made through the first user interface to output the video data and the audio data separately, through the different electronic devices, control display of a second user interface that allows a user to select a first electronic device to output the video data and select a second electronic device to output the audio data.

11. The electronic device of claim 1, wherein the control unit is configured to:
   after detection of the predetermined event, monitor for when the second electronic device is completely prepared to output the other of the video data or the audio data that is not output from the first electronic device;
   continue to control the first electronic device to output the video data and the audio data until the monitoring reveals that the second electronic device is completely prepared to output the other of the video data or the audio data that is not output from the first electronic device; and
   control separate output of the video data and the audio data on the different electronic devices based on the monitoring revealing that the second electronic device is completely prepared to output the other of the video data or the audio data that is not output from the first electronic device.

12. The electronic device of claim 1, wherein the control unit is configured to:
   determine whether an electronic device selected to output the video data is in an off state when the predetermined event occurs, and
   based on determining that the electronic device selected to output the video content data is in the off state when the predetermined event occurs, control the electronic device selected to output the video data to allow a module used for video output to enter an on state.

13. The electronic device of claim 1, wherein the control unit is configured to control output of the video data and the audio data in synchronization with each other.

14. The electronic device of claim 1, wherein the control unit is configured to provide a user interface that allows a user to control output timing for the video data and the audio data being separately output on different electronic devices.

15. The electronic device of claim 1, wherein the control unit is configured to:
   determine that the first electronic device outputs the audio data after the predetermined event occurs, and
   based on determining that the first electronic device outputs the audio data after the predetermined event occurs, control a display of the first electronic device that output the video data to enter a sleep mode for power saving.

16. The electronic device of claim 1, wherein the control unit is configured to:
   detect occurrence of a predetermined integration event while the video data and the audio data are being separately output on the different electronic devices, and
   based on detection of the predetermined integration event:
      discontinue separate output of the video data and the audio data on the different electronic devices, and
      control output of the video data and the audio data together on a single electronic device.

17. The electronic device of claim 16, wherein the control unit is configured to detect occurrence of the predetermined integration event by detecting occurrence of at least one of movement of the first electronic device more than a predetermined distance, or receipt of a user's request to integrate the video data and the audio data.

18. An electronic device comprising:
   an output unit; and
   a control unit configured to:
      output content through the output unit;
      determine, while the content is being output through the output unit of the electronic device, that another electronic device is available to participate in outputting the content;
      determine that the content is being output through the output unit of the electronic device at a specific sound level when the other electronic device is available to participate in outputting the content; and
      control the content to be output through the other electronic device based on determining that the content is being output through the output unit of the electronic device at the specific sound level when the other electronic device is available to participate in outputting the content.

19. An operating method of an electronic device, comprising:
   controlling a first electronic device to output content including video data and audio data;
   detecting occurrence of a predetermined event related to output of the content; and
   based on detection of the predetermined event related to output of the content, controlling separate output of the video data and the audio data on different electronic devices by:
      controlling the first electronic device to output one of the video data or the audio content data, and
      controlling a second electronic device to output the other of the video data or the audio data that is not output from the first electronic device, the second electronic device being separate from the first electronic device,
   wherein the different electronic devices are recognized by the electronic device according to a predetermined protocol.

20. An operating method of an electronic device, comprising:
   outputting content through an output unit;
   determining, while the content is being output through the output unit of the electronic device, that another electronic device is available to participate in outputting the content;
   determining that the content is being output through the output unit of the electronic device at a specific sound level when the other electronic device is available to participate in outputting the content; and
   controlling the content to be output through the other electronic device based on determining that the content is being output through the output unit of the electronic device at the specific sound level when the other electronic device is available to participate in outputting the content.

* * * * *